Nov. 8, 1955  S. G. MARGLES ET AL  2,723,020
MOVING STAIRWAYS
Filed March 22, 1954
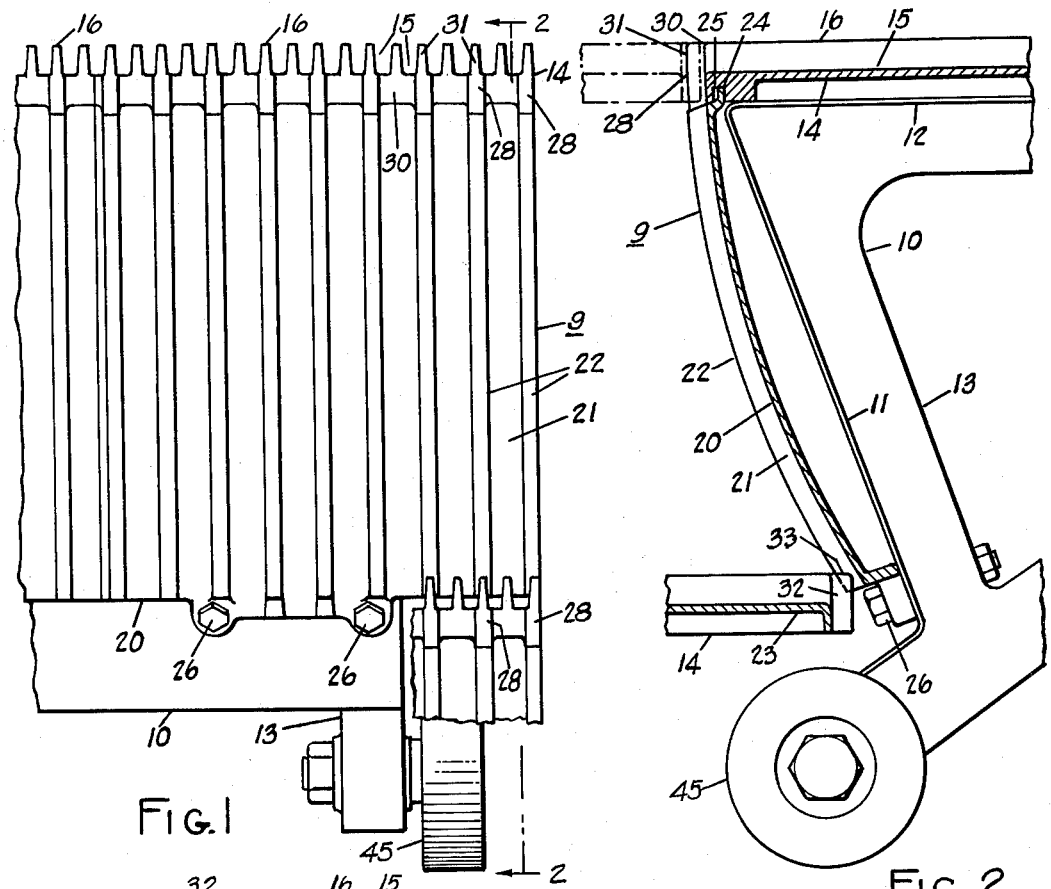
FIG. 1
FIG. 2
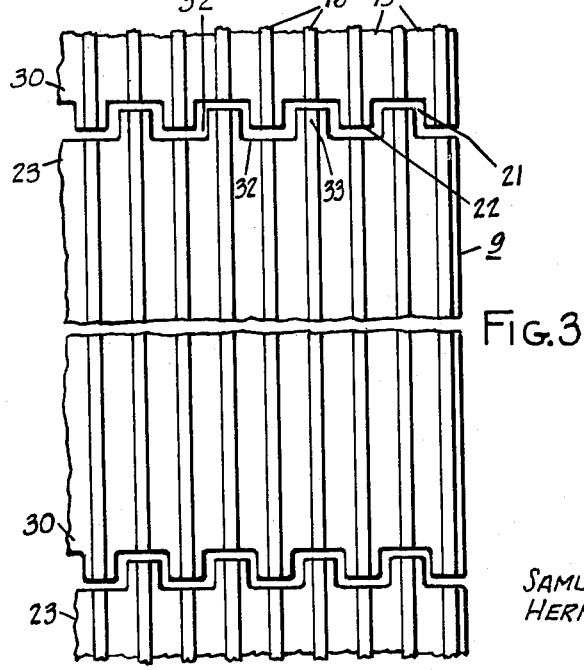
FIG. 3
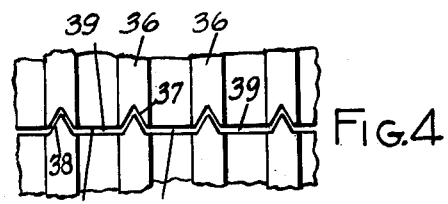
FIG. 4
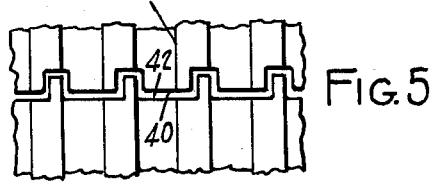
FIG. 5
SAMUEL GUSTAVE MARGLES
HERMAN RUDOLPH YOST } INVENTORS
BY Leon H. Emrick ATTORNEY

United States Patent Office 2,723,020
Patented Nov. 8, 1955

2,723,020

MOVING STAIRWAYS

Samuel Gustave Margles, Brooklyn, N. Y., and Herman Rudolph Yost, Lincoln Park, N. J., assignors to Otis Elevator Company, New York, N. Y., a corporation of New Jersey Application March 22, 1954, Serial No. 417,902

5 Claims. (Cl. 198—16)

The invention relates to moving stairways.

It is common practice in moving stairways to provide cleats on the step treads for meshing with combplates at the stairway ends to facilitate passenger transfer. Various arrangements have been proposed to minimize the possibility of damage or injury as a result of objects being caught between the end of a step tread and the riser of the step ahead of an ascending stairway and carried into the combplate. One proposed arrangement was to provide cleats ont he riser extending between the tread cleats of the adjacent step. However, because of the combplate teeth, these riser cleats were not extended above the bottom of the grooves between tread cleats. Therefore, a straight line of clearance existed between adjacent steps during transition from step to platform formation from the point where the tread of the following step reached the bottom of the tread groove of the step ahead. Also in one proposed arrangement the grooves between riser cleats gradually decreased in depth toward the top of the step. Thus there still existed a possibility of getting say a loosely fitting overshoe caught between steps during the last inch or so of the transition from step to platform formation, provided the foot were moved forward against the edge of the step ahead at this time.

The object of the invention is to provide protection against objects getting caught between adjacent steps during the whole transition from step to platform formation.

The invention involves arranging the tread and riser of adjacent steps to provide a meshing cleat relationship for the entire transition from step to platform formation, without obstructing the grooves between tread cleats. In carrying out the invention in accordance with one arrangement which will be described, the riser cleats are of uniform depth and extend the full height of the step. They are in line with alternate tread cleats and are formed of ribs on the riser and extensions on the ends toward the following step of the treads and tread cleats aligned with the ribs. At the other end of the step, the tread plate and tread cleats aligned with the riser cleats are recessed to enable the tread plate and inbetween tread cleats to mesh with the riser cleats of the step ahead. This provides a zigzag line or clearance between the riser of a step and the tread of the following step for the full height of the step and thus minimizes the possibility of objects being caught between adjacent steps during transition and carried into the combplate teeth.

Another possibility of objects such as overshoes being caught is in the space between the sides of the step and the skirt panels of an ascending stairway. This is obviated by providing spacing rollers extending horizontally from the sides of the steps and adjusting the skirt panels against these rollers to provide a constant uniform clearance, with the rollers set so that this clearance is a minimum. This also assists in maintaining the desired clearance between riser cleats and the recesses in adjacent treads into which they extend.

Features and advantages of this invention will be seen from the above statements and from the following description and appended claims.

In the drawings:

Figure 1 is a fragmental view, facing the riser of a step, of adjacent steps with meshing riser cleats and tread cleats embodying the invention;

Figure 2 is a view in section, taken along the line 2—2 of Figure 1, showing the construction of the riser and also illustrating adjacent steps both in step and in platform formation;

Figure 3 is a plan view of the steps of Figures 1 and 2 in platform formation;

Figure 4 is a view, similar to Figure 3, of another embodiment of the invention;

Figure 5, is a view, similar to Figure 3, of still another embodiment of the invention;

Figure 6 is a diagrammatic representation in side elevation of the upper end of a moving stairway, with the steps provided with side spacing rollers;

Figure 7 is a plan view, somewhat diagrammatic, of the step and skirt panel arrangement of Figure 6 for one step; and Figure 8 is a sectional view of the same, taken along line 8—8 of Figure 6.

Referring first to Figures 1, 2 and 3, each step 9 comprises a step frame 10 having a riser portion 11 and a tread portion 12 secured at each side to a yoke 13. Upon the tread portion is mounted a tread plate 14 made up of sections, each provided with a plurality of longitudinally extending grooves 15 to form cleats 16. The riser portion 11 of the step frame is provided with a facing 20 formed in sections, each provided with a plurality of vertically extending grooves 21 to form cleats 22. Across the top of the riser facing are formed lip portions 24. These hook in slots 25 in the tread to secure the facing in place at the top. At the bottom the facing is held in place by means of screws 26.

A riser cleat is provided for only every other tread cleat 16 and is aligned therewith. The riser cleats extend to the top of the facing and the grooves 21 between them are of uniform depth throughout their height. Cleats 22 are extended in effect to the top of the tread cleats by forming extensions 28 on the forward end 30 of the tread, the ends 31 of the tread cleats forming the top ends of the riser cleats. The extensions 28 project out substantially the same distance as cleats 22, it being preferred to set them back slightly, as exaggeratedly illustrated, to avoid any possibility of their being extended beyond cleats 22 on assembly. Below the ends 31, the riser cleats are made wider than the tread cleats as they are double the pitch and space permits. The rear end 23 of the step tread is formed with recesses 32 to receive the riser cleats of the step ahead. These recesses are in line with the tread cleats opposite the riser cleats of the step ahead so as to enable the inbetween tread cleats to mesh with the riser cleats. The curvature of the riser cleas 22 is such as to correspond with the path of movement of the tops 33 of the inbetween tread cleats at the end of the step facing the riser of the step ahead during the transition from step to platform formation. With this arrangement, a uniform operating clearance, of say three thirty-seconds of an inch, is maintained between the riser cleats and the tread cleats throughout the transition from step to platform formation and a zigzag line of clearance of dentate form is provided between the riser and step tread of adjacent steps throughout the transition and while in platform formation. Inasmuch as the riser cleats are aligned with tread cleats, they can be run to the top of the tread cleats without danger of interference with the combplate teeth. It is preferred to utilize a construction in which the tread cleats are narrow and of small pitch, say one-third of an inch, and with shallow grooves between treads, as this assists in providing protection.

Another arrangement is illustrated in Figure 4 in which the riser cleats 35 alternate with the tread cleats 36. Grooves 37 are provided in the riser to form the riser cleats, these grooves being V shaped and being aligned with the tread cleats. The riser cleats at the top of the step are formed by the tread cleats at the sides of the grooves. In this way a portion of the riser cleat is aligned with and extends to the top of the tread cleat. The ends 38 of the tread cleats of the succeeding step facing the riser are reciprocally V shaped to extend into the grooves 37, the riser cleats 35 in turn extending into recesses 39 between ends 38. Thus a serrated form of zigzag line of clearance is provided between adjacent steps. This arrangement is more suitable for constructions utilizing wider tread cleats and grooves.

Still another arrangement is illustrated in Figure 5 which is particularly suitable for constructions utilizing wider tread cleats and grooves. In this construction a riser cleat 40 is provided for each step tread cleat 41, with a portion of the riser cleat aligned with a portion of the tread cleat. The rear end of the tread is formed with recesses 42 extending from one side of a tread cleat into a portion of the adjacent tread cleat and the riser cleats are formed to extend into these recesses. Here again a portion of the riser cleats extends to the top of the tread cleats and a dentate line of clearance is provided between steps throughout their transition from step to platform formation.

Referring now to Figures 6, 7 and 8, each step is provided at each side with a step wheel 44 and a trailer wheel 45 mounted on the step yokes. These wheels run on tracks 46 and 47, these tracks being merged on the incline. The outer edges of tracks 46 are provided with flanges 48 for guiding the steps, these flanges being set with a minimum operating clearance with respect to the step wheels, say one sixty-fourth of an inch on each side. Notwithstanding this, it has been found with prior constructions, due to lost motion in the wheels, running gear chains and other parts, a considerable side motion of the step is possible. As a result, the skirt panels 51, which form the lower part of the balustrading, have to be set with sufficient clearance to allow for this side motion. Thus a considerable clearance may arise between a step tread and skirt panel due to shift of the step to one side, as much as one-eighth of an inch, or even more with certain constructions, which increases with wear, having been found in practice. Thus there is the possibility on an ascending stairway of an object such as an overshoe being drawn into and caught in this gap.

In the improved construction illustrated, each step 9 is provided with a pair of spacing rollers in the form of casters 50, one on each side thereof, which extend horizontally and run beneath the step tread 14 on the skirt panels 51. The casters are mounted on the step frame yokes 13. Each caster comprises a wheel 52 of fairly hard rubber rotatably mounted in a stock 53. The stock is pivotally mounted on a spindle 54 with ball bearings (not shown) in accordance with usual caster construction. The spindle is threaded for securing the caster in a horizontal threaded aperture in the yoke 13. A lock nut 55 secures the caster in place. The stock is weighted, as at 56 to counterbalance the weight of the wheel 52. Thus the caster is in a state of neutral equilibrium so that it will readily follow without sliding the step in its movement between landings.

The wheels 52 of the casters extend out slightly beyond the step tread 14. The skirt panels 51 are mounted on brackets 60 secured to the stairway truss (not shown) and adjusted so as to contact the wheels, this being somewhat schematically illustrated as effected by nuts 61, arranged one on each side of the brackets, on studs 62 extending from plates 63 secured to the skirt panel. This enables a small constant operating clearance to be maintained between the step treads 14 and the skirt panels 51, say one thirty-second of an inch on each side and prevents side shifting of the step tread with respect to the skirt panels. Thus, the possibility of objects being drawn into the space between the skirt panels and the step tread of an ascending stairway is minimized. Also, this insures the proper lining up of the steps so as to maintain proper clearance between riser cleats and the recesses in adjacent step treads.

It is to be understood that the cleated riser construction may be employed without the spacing rollers and that the spacing rollers are applicable to other step constructions, with or without cleated risers.

As many changes could be made in the above constructions and many apparently widely different embodiments of this invention could be made without departing from the scope thereof, it is intended that all matter contained in the above description or shown in the accompanying drawings shall be interpreted as illustrative and not in a limiting sense. What is claimed is:

1. A moving stairway in which each step has a curved riser and a tread, with the tread provided with a plurality of longitudinally extending cleats, the tread cleats of each step being aligned with those of each of the other steps, in which each step is provided with a plurality of cleats which extend upwardly on the face of the riser and to the top of the tread cleats, and in which the end of the tread of the following step facing the riser is provided with recesses to receive the upwardly extending cleats, characterized in that for each step said upwardly extending cleats are provided for and aligned with only alternate tread cleats and that said recesses are only at said alternate tread cleats.

2. A moving stairway in which each step has a curved riser and a tread, with the tread provided with a plurality of longitudinally extending cleats, the tread cleats of each step being aligned with those of each of the other steps, in which each step is provided with a plurality of cleats which extend upwardly on the face of the riser and to the top of the tread cleats, and in which the end of the tread of the following step facing the riser is provided with recesses to receive the upwardly extending cleats, characterized in that the center lines of said upwardly extending cleats and of said recesses are aligned with the center lines of tread cleats.

3. A moving stairway in which each step has a curved riser and a tread, with the tread provided with a plurality of longitudinally extending cleats, the tread cleats of each step being aligned with those of each of the other steps, in which each step is provided with a plurality of cleats which extend upwardly on the face of the riser and to the top of the tread cleats and which are of a curvature concentric with the path of movement of the riser facing end of the following step during the transition of these steps from step to platform formation, in which the grooves between upwardly extending cleats are of uniform depth from the bottom to the top of the step, and in which the end of the tread of the following step facing the riser is provided with recesses to receive the riser cleats, characterized in that for each step said upwardly extending cleats are provided for and aligned with only alternate tread cleats, that said recesses are only at said alternate tread cleats, and that the center lines of said upwardly extending cleats and of said recesses are aligned with the center lines of said alternate tread cleats.

4. A moving stairway in which each step has a curved riser and a tread, with the tread provided with a plurality of longitudinally extending cleats, the tread cleats of each step being aligned with those of each of the other steps, in which the ends of the tread cleats of each step facing the riser of the step ahead are perpendicular to the top of the tread, in which each step is provided with a plurality of cleats which extend upwardly on the face of the riser, are formed at their upper ends by extensions on the other end of the tread so as to extend to the top of the tread cleats and are of a curvature concentric with the path of movement of said riser facing end of said following step during transition of these adjacent steps from step to platform formation, in which the grooves between upwardly extending cleats are of uniform depth from the bottom to the top of the step, and in which the end of the tread of the following step facing the riser is provided with recesses to receive the upwardly extending cleats, characterized in that for each step said upwardly extending cleats are provided for and aligned with only alternate tread cleats and below said extensions are wider than the tread cleats, that said recesses are only at said alternate tread cleats, and that the center lines of said upwardly extending cleats and of said recesses are aligned with the center lines of said alternate tread cleats.

5. A moving stairway in which each step has a curved riser and a tread, with the tread provided with a plurality of longitudinally extending grooves forming cleats, the tread cleats of each step being aligned with those of each of the other steps, in which the ends of the tread cleats of each step facing the riser of the step ahead are perpendicular to the top of the tread, in which each step is provided with a plurality of cleats which extend upwardly on the face of the riser, are formed at their upper ends by extensions on the other end of the tread so as to extend to the top of the tread cleats and are of a curvature concentric with the path of movement of said riser facing end of said following step during transition of these adjacent steps from step to platform formation, in which the grooves between upwardly extending cleats are of uniform depth from the bottom to the top of the step, and in which the end of the tread of the following step facing the riser is provided with recesses to receive the upwardly extending cleats, characterized in that for each step said upwardly extending cleats are provided for and aligned with only alternate tread cleats and below said extensions are wider than said tread cleats, that said extensions are set back slightly from the portions of said upwardly extending cleats below them, that said recesses are only at said alternate tread cleats, and that the center lines of said upwardly extending cleats and of said recesses are aligned with the center lines of said alternate tread cleats.

References Cited in the file of this patent

UNITED STATES PATENTS 1,023,443     Seeberger             Apr. 16, 1912

FOREIGN PATENTS 588,418     France                Jan. 30, 1925